United States Patent
Erler (10) Patent No.: US 11,537,078 B2
(45) Date of Patent: Dec. 27, 2022

(54) LIGHTING DEVICE FOR VEHICLES

(71) Applicant: Carl Zeiss Jena GmbH, Jena (DE)

(72) Inventor: Christoph Erler, Jena (DE)

(73) Assignee: CARL ZEISS JENA GMBH, Jena (DE)

( * ) Notice: Subject to any disclaimer, the term of this patent is extended or adjusted under 35 U.S.C. 154(b) by 232 days.

(21) Appl. No.: 16/334,512

(22) PCT Filed: Sep. 20, 2017

(86) PCT No.: PCT/EP2017/073797
§ 371 (c)(1),
(2) Date: Mar. 19, 2019

(87) PCT Pub. No.: WO2018/054985
PCT Pub. Date: Mar. 29, 2018

(65) Prior Publication Data
US 2020/0409305 A1    Dec. 31, 2020

(30) Foreign Application Priority Data

Sep. 23, 2016  (DE) .......................... 102016117969.8

(51) Int. Cl.
*G03H 1/00* (2006.01)
*F21S 43/14* (2018.01)
(Continued)

(52) U.S. Cl.
CPC .......... *G03H 1/0005* (2013.01); *B60Q 1/2607* (2013.01); *F21S 43/14* (2018.01);
(Continued)

(58) Field of Classification Search
CPC .. G03H 1/0005; G03H 1/0248; G03H 1/2202; F21S 43/14; B60Q 1/2607
(Continued)

(56) References Cited

U.S. PATENT DOCUMENTS 4,916,593 A * 4/1990 Moss .................... B60Q 1/302
                                                    362/503
5,101,193 A * 3/1992 Smith .................... B60Q 1/302
                                                    340/468

(Continued)

FOREIGN PATENT DOCUMENTS

CN        1784629 A      6/2006
CN      101171553 A      4/2008
(Continued)

OTHER PUBLICATIONS

Brenner, K.-H., et al., "Design and Fabrication of Arbitrary, non-Separable Continuous Phase Elements", OSA/DOMO 2000, 2000, pp. 237-239.
(Continued)

*Primary Examiner* — Bryon T Gyllstrom
(74) *Attorney, Agent, or Firm* — Murphy, Bilak & Homiller, PLLC (57) ABSTRACT

A lighting device (31), in particular a rear luminaire, for a vehicle (30) is provided. The lighting device (31) has a hologram (34) and a light source (32) for illuminating the hologram (34). An image, more particularly a real image (35), is thereby generated, which can also lie outside the physical boundaries of the lighting device (31).

9 Claims, 8 Drawing Sheets

(51) Int. Cl.
*B60Q 1/26* (2006.01)
*G03H 1/02* (2006.01)
*G03H 1/22* (2006.01)
*F21Y 115/10* (2016.01)

(52) U.S. Cl.
CPC ......... *G03H 1/0248* (2013.01); *G03H 1/2202* (2013.01); *B60Q 2400/50* (2013.01); *F21Y 2115/10* (2016.08); *G03H 2001/2234* (2013.01)

(58) Field of Classification Search
USPC ........................................................ 362/509
See application file for complete search history.

(56) References Cited

U.S. PATENT DOCUMENTS

| | | | |
|---|---|---|---|
| 5,455,747 A * | 10/1995 | Aoyama | F21S 43/15 362/545 |
| 5,488,493 A * | 1/1996 | Moss | B60Q 1/302 359/13 |
| 5,571,277 A * | 11/1996 | Allred | F21V 5/002 362/459 |
| 5,963,345 A | 10/1999 | Smith | |
| 7,088,483 B1 | 8/2006 | Efimov | |
| 7,635,200 B2 | 12/2009 | Atsushi | |
| 8,458,932 B2 * | 6/2013 | Schnuckle | G09F 19/12 40/310 |
| 8,704,256 B2 | 4/2014 | Sekii et al. | |
| 9,091,407 B2 | 7/2015 | Dubosc et al. | |
| 2002/0034710 A1 | 3/2002 | Morris et al. | |
| 2002/0145797 A1 | 10/2002 | Sales | |
| 2005/0078486 A1 | 4/2005 | Kawaguchi | |
| 2006/0291185 A1 | 12/2006 | Atsushi | |
| 2012/0229611 A1 | 9/2012 | Pellman et al. | |
| 2013/0010487 A1 | 1/2013 | Buisson | |
| 2013/0116049 A1 | 5/2013 | Pellman et al. | |
| 2013/0147353 A1 | 6/2013 | Mandelboum et al. | |
| 2014/0085916 A1 | 3/2014 | Dubosc et al. | |
| 2015/0219908 A1 | 8/2015 | Lee et al. | |
| 2015/0232018 A1* | 8/2015 | Augst | G09F 19/18 340/468 |
| 2017/0276843 A1* | 9/2017 | Hohmann | F21S 43/00 |
| 2017/0371298 A1* | 12/2017 | Murphy | G03H 1/0236 |
| 2018/0290586 A1* | 10/2018 | Muegge | F21S 43/40 |

FOREIGN PATENT DOCUMENTS

| | | | |
|---|---|---|---|
| CN | 101675291 A | 3/2010 | |
| CN | 101932874 A | 12/2010 | |
| CN | 102520512 A | 6/2012 | |
| CN | 102681293 A | 9/2012 | |
| CN | 104819423 A | 8/2015 | |
| CN | 105487244 A | 4/2016 | |
| DE | 19623749 A1 | 5/1997 | |
| DE | 102005019257 A1 | 11/2006 | |
| DE | 102007045332 A1 | 3/2009 | |
| DE | 102009053571 A1 | 5/2011 | |
| DE | 102011051734 A1 | 3/2012 | |
| DE | 102013003441 A1 | 9/2014 | |
| DE | 102014204535 A1 | 10/2015 | |
| DE | 102014117837 A1 | 6/2016 | |
| EP | 0950848 A2 | 10/1999 | |
| EP | 1916471 A1 | 4/2008 | |
| EP | 2336632 A1 | 6/2011 | |
| EP | 2587113 A1 | 5/2013 | |
| EP | 2905530 A1 | 8/2015 | |
| EP | 2276076 B1 | 3/2016 | |
| FR | 2919913 A1 | 2/2009 | |
| FR | 2995978 A1 | 3/2014 | |
| JP | 2009169012 A | 7/2009 | |
| WO | 2011113937 A1 | 9/2011 | |
| WO | 2012032670 A1 | 3/2012 | |
| WO | 2014106584 A1 | 7/2014 | |
| WO | 2015173814 A2 | 11/2015 | |

OTHER PUBLICATIONS

Cumme, Matthias, et al., "From Regular Periodic Micro-lens Arrays to Randomized Continuous Phase Profiles", Adv. Opt Techn, 2015, pp. 47-61.

Makowski, Michal, et al., "Simple Holographic Projection in Color", Optical Society of America, vol. 20, No. 22, Oct. 22, 2012, pp. 25130-25136.

Néauport, Jérôme, et al., "Design and Optical Characterization of a Large Continuous Phase Plate for Laser Integration Line and Laser Megajoule Facilities", Optical Society of America, Applied Optics, vol. 42, No. 13, May 1, 2003, pp. 2377-2382.

Reichel, Steffen, et al., "Glass Micro-Optics for Laser Beam Shaping and LED Collimation", Conference Paper, Optical Fabrication and Testing, Jackson Hole, Wyoming United States, Jun. 13-17, 2010, 3 pages.

Ruffieux, et al., "Two step process for the fabrication of diffraction limited concave microlens arrays", Optical Society of America, vol. 16, No. 24, 2008, 9 pages.

EP Communication Pursuant to Article 94(3) dated Mar. 2, 2021 (original and English translation), issued in Application No. DE17 771 430.0-1015, 10 pages.

Chinese Office Action dated Jun. 28, 2021 (original and English translation), issued in Application No. CN2021062302462800, 20 pages.

* cited by examiner

LIGHTING DEVICE FOR VEHICLES

TECHNICAL FIELD

The present application relates to a lighting device for vehicles such as motor vehicles, for example. In particular, the present application relates to rear luminaires for vehicles, but is not limited thereto.

BACKGROUND

Lighting devices are used in vehicles firstly in order to illuminate an environment of the vehicle, in order to enable visibility for a driver of the vehicle even in the dark, and secondly to make other persons or vehicles aware of the vehicle equipped with the lighting device. Examples of such lighting devices are front headlights in motor vehicles, rear luminaires or flashing indicators.

Besides their technical function, such lighting devices are increasingly also being used to give vehicles of a specific brand a distinctive appearance, for example. In this case, principally the outer shape of such lighting devices is used as a design feature. Increasingly, the luminous signature of such lighting devices is also being configured in a characteristic fashion. By way of example, characteristic luminous signatures are used in rear luminaires of vehicles. At the same time, ever more stringently defined boundary conditions exist here with regard to structural space and arrangement on the vehicle, for example in order to be able to maximally utilize a width of a load-carrying space. In order to avoid the limitations mentioned in the examples cited or in order to satisfy the boundary conditions demanded by the legislature and those demanded by vehicle design, greatly adapted optical concepts are often required. Mirrors, prisms and macroscopic diffusing structures are traditionally used here in order to realize desired lighting devices.

Examples of lighting devices which achieve particular optical effects by means of light emitting diodes are known for example from FR 2 995 978, U.S. Pat. No. 9,091,407 B1, EP 07 020 676 A1, EP 2 336 632 A1, WO 2011/113937 A1, US 2013/0010487 A1, or US 2014/0085916 A1. Light emitting diode rear luminaires of a vehicle that are known from such documents exhibit a 3D effect as a result of multiple reflection by a mirror system comprising a partly transmissive mirror and a mirror having substantially 100% refraction. A light source used comprises a combination of different light emitting diodes in a compact housing. The shape of said housing prescribes an optical shape that is multiply reflected.

In this conventional procedure, however, the design latitude is limited, and the mirrors and light source arrangements used require a corresponding structural space.

For the new field of autonomously driving vehicles, the rear luminaire does not just have a lighting function, rather a possible way of allocating a communicative role to the traditional rear light for human-machine interaction is being sought. By way of example, the rear luminaire can give a passerby to understand that he/she can pass by.

A signal can be given to a vehicle traveling behind if said vehicle moves too close.

In order to realize this, besides the traditional lighting function, the rear luminaire must include a projection possibility with variable content, which is preferably switched on only as necessary.

Therefore, it is an object of the present application to provide improved possibilities in this regard.

A lighting device as claimed in claim 1 is provided for this purpose. The dependent claims define further embodiments.

SUMMARY

According to the invention, a lighting device for a vehicle, in particular a motor vehicle, is provided, comprising a hologram, and a light source for illuminating the hologram, wherein the hologram is configured to generate an image as a response to the illumination.

The use of a hologram makes it possible to generate different patterns as images even outside the physical boundary of the lighting device and thus to create characteristic luminous signatures.

The image can be a real image. The real image then serves as it were as a virtual light source of the lighting device having a desired shape.

The image can have a dimensioning smaller than a dimensioning of the hologram. A spatial effect can be achieved as a result.

The hologram can be configured to generate the image outside physical boundaries of the lighting device. Particular 3D effects are possible as a result.

A distance between the lighting device and the image here can be between 50 and 200 mm, e.g. approximately 100 mm.

The hologram can comprise a multiplicity of individual holograms, such that the image comprises a multiplicity of individual images, wherein the individual images have different spatial orientations.

The use of a plurality of individual holograms makes it possible to satisfy requirements with regard to an angular range in which the lighting device can be seen.

In this case, the individual images can have different shapes, such that the lighting device has a different appearance from different viewing directions.

The hologram can also be configured to generate the image with a curved shape. In this case, the shape can correspond to a segment of a lateral surface of a cylinder or to a segment of a spherical surface.

The provision of a curved shape also makes it possible to satisfy requirements with regard to visibility. In particular, the multiplicity of individual holograms or the curved shape can be configured to enable a viewability of the image in a plane from an angular range greater than 45°, in particular greater than 90°, e.g. in order to comply with standards for vehicle luminaires. In the state in which the lighting device is incorporated in a vehicle, the plane can be a plane parallel to the ground. Standards often demand a greater visibility range here.

The hologram can have a color filter function for the light source. Requirements regarding the narrowband nature of the light source can be met as a result.

The lighting device can be a rear luminaire for a motor vehicle.

In this way, it is possible to create rear luminaires having desired designs.

The light source can comprise a light emitting diode. In this regard, a suitable light source can be provided in a cost-effective manner.

The device can additionally comprise an image generator, which modulates light from the light source, for example, in order to generate desired image contents. Additionally or alternatively, the hologram can comprise a plurality of individual holograms in a manner corresponding to different image contents. In this way, it is possible to implement an indication function in particular for autonomously driving vehicles. This can also be provided in addition to a conventional lighting function. Here the hologram then acts as it were as a projection screen for the image contents that are prescribed by the image generator.

The use of holograms, in particular volume holograms, as a projection screen is advantageous here since these angle- and wavelength-selective transparent elements can be installed in the existing structural space of a rear luminaire and manifest their effect only upon illumination from a specific angle with a specific wavelength. Otherwise they act as a passive transparent additional element in the rear luminaire.

The hologram can comprise a hologram stack having a plurality of stacked individual holograms comprising at least one reflection hologram, wherein the hologram stack is configured to generate the image on a side of the hologram stack facing away from the light source. As a result, it is possible to combine advantages of reflection holograms with regard to angle acceptance and wavelength selectivity with an arrangement in transmission, which can be advantageous for incorporation into vehicles.

BRIEF DESCRIPTION OF THE DRAWINGS

The invention is explained in greater detail below on the basis of exemplary embodiments with reference to the accompanying drawings. In the figures.

DETAILED DESCRIPTION

Various exemplary embodiments are explained in detail below. These exemplary embodiments serve merely for elucidation and should not be interpreted as restrictive. In particular, a description of an exemplary embodiment having various features and details should not be interpreted to the effect that all these features or details are necessary for implementation. By way of example, in other exemplary embodiments, volume holograms can also be arranged differently than illustrated, and/or transmission holograms can be replaced by reflection holograms, or vice versa.

In the figures, in order to avoid repetition, identical or mutually corresponding elements bear the same reference signs and are not explained repeatedly.

In exemplary embodiments, use is made of volume holograms for beam shaping and/or wavelength filtering of light from a light source, for example a light emitting diode light source. As a result, it is possible to realize lighting devices such as, for example, rear luminaires for vehicles, in particular motor vehicles, which offer novel optical effects. In particular, it is possible to generate virtual or real images outside a physical boundary of a lighting device such as a rear luminaire.

The exemplary embodiments discussed in the present application comprise one or more volume holograms, also referred to hereinafter simply as holograms or holographic gratings. Volume holograms generally operate wavelength- and angle-selectively. This selectivity can be set in a targeted manner by means of the design of the hologram, in particular by way of the thickness of the volume hologram and the designed angle, i.e. the angle at which an exposure is carried out during the production of the hologram. These properties can be utilized to configure an emission characteristic of a light source, for example of a light emitting diode or of a light emitting diode arrangement, in substantially any desired fashion within wide limits. As a result of the wavelength selectivity and angle selectivity, it is possible here to combine beam shaping and color filtering in one hologram.

In this case, a volume hologram should generally be understood to mean a hologram which is generated by exposure of a light-sensitive volume material. Such volume holograms are also referred to as holographic gratings.

Volume holograms are phase gratings, that is to say that in the holographic medium the refractive index was locally changed in a targeted manner (i.e. by means of holographic exposure). The phase of an incoming wave changes as a result. The structure of this local phase change brings about a diffraction of an incoming wave in a specific direction. Restitution of a hologram should be understood to mean irradiating a hologram with light in order to "activate" the hologram, e.g. to reproduce image information contained in the hologram. A holographic function of a hologram determines how the hologram modifies incident light in order e.g. to reproduce image contents.

In principle, any desired optical function can be realized by means of such holograms. The degree of freedom of the optical design here in exemplary embodiments is significantly higher than in conventional diffractive and refractive solutions (for example by means of lenses, mirrors and the like). Moreover, interference orders and ghost gratings can be suppressed in a targeted manner in the case of volume holograms.

Both transmission and reflection holograms, in particular holographic gratings, can be used for such beam shaping and/or such a filter function. This will now be explained with reference to FIGS. 1 and 2.

Figure 1:
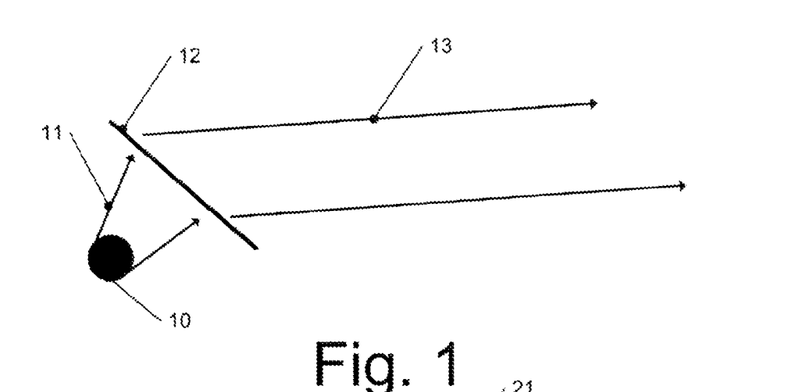
FIG. 1 shows a diagram for elucidating beam shaping by means of a transmission hologram.

FIG. 1 here shows an example in which a transmission hologram 12, in particular a transmission grating, implemented as a volume hologram, is illuminated with light 11 from a light source 10. The light source 10 can be in particular a light emitting diode or a light emitting diode arrangement. In the case of a light emitting diode arrangement, all the light emitting diodes can be of identical design and have in particular a nominally identical emission spectrum. Red light emitting diodes, in particular, can be used for an application for rear luminaires. In other exemplary embodiments, different-colored light emitting diodes with correspondingly different adapted holograms can also be used.

Usually, only coherent light sources are used in the restitution of transmission holograms (e.g. in the reproduction of images recorded in such holograms). If a sharp image is intended to be generated by the transmission hologram and a broadband light emitting diode is nevertheless intended to be used as light source 10, the wavelength range can be limited by the targeted use of color filters (e.g. interference filters, or volume-holographic wavelength filters).

The light 11 emanating from the light source 10 is shaped by the hologram 12 to form a beam 13 having desired properties with regard to wavelength and angular distribution. As will be explained later, it is possible to provide in particular images of the light source in a desired form in order thus as it were to create virtual light sources in space.

Figure 2:
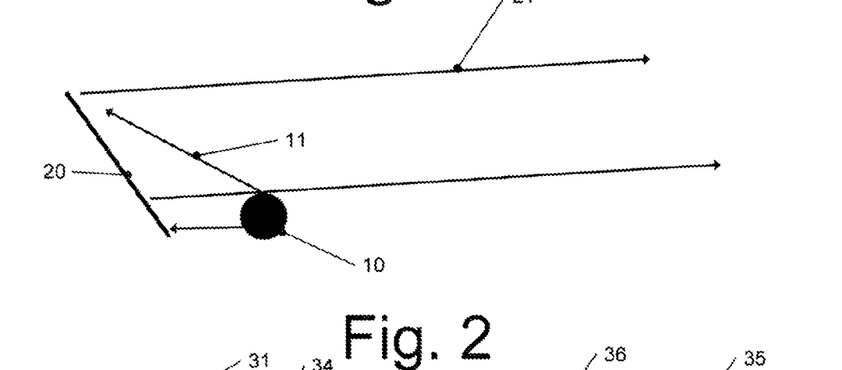
FIG. 2 shows a diagram for elucidating beam shaping with a reflection hologram.

FIG. 2 shows a corresponding arrangement for a reflection hologram 20, in particular a reflection grating. The latter is in turn irradiated with light 11 from the light source 10, which can be constructed in the manner as already explained for FIG. 1. In this regard, a shaped beam 21 is formed which can have desired properties with regard to angular distribution and wavelength, which properties are in turn determined by the reflection hologram 20.

Such holograms can be produced in a manner known per se by a light-sensitive material being exposed with coherent light and being correspondingly developed. Further specimens of such a hologram can then be produced by means of an optical contact copy, for example. For the exposure, in particular a first coherent light source can be arranged at the location of the light source (light source 10 in FIGS. 1 and 2), and a further light source can be arranged at a location of a real image that is generated by the beams 13 and 21, respectively.

The type of hologram used can be chosen depending on the application. In particular, transmission holograms are usually designed for monochromatic sources, in particular laser light sources. However, since light emitting diodes are preferred as light sources for cost reasons, for example, it is possible, if the light emitting diodes are not sufficiently narrowband, to carry out a color filtering which can likewise be done by means of a volume hologram. Such a volume hologram, serving as a color filter, can also be integrated into the hologram 34 in FIG. 3, such that the hologram 34 provides a color filter function and beam shaping function.

In the case of reflection holograms, by contrast, it is possible to choose the design by means of a corresponding thickness of the hologram such that they act as white light reflection holograms, that is to say that they themselves choose their "playback wavelength" from a spectrum offered.

Figure 3:
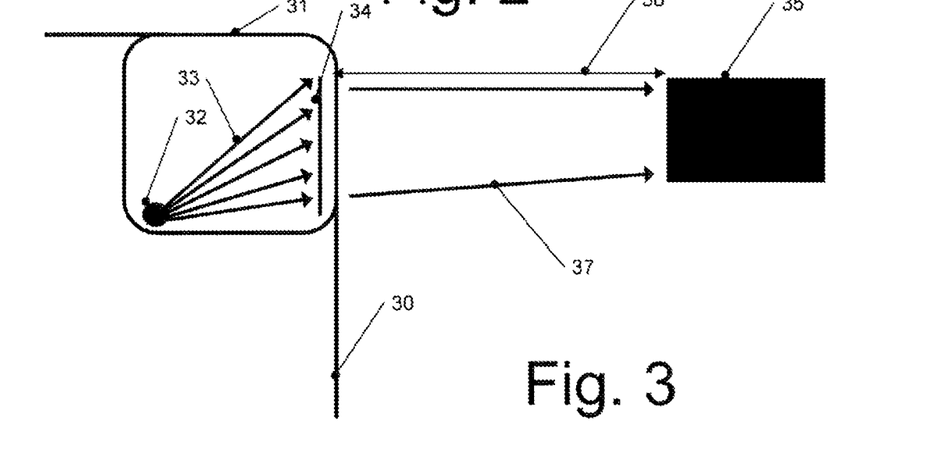
FIG. 3 shows a schematic illustration of a rear luminaire of a vehicle in accordance with one exemplary embodiment.

As an example of a lighting device for a motor vehicle, FIG. 3 shows a rear luminaire 31 in accordance with one exemplary embodiment. However, the present application is not restricted to rear luminaires, and other lighting devices, for example flashing indicators or brake luminaires, can likewise be implemented using volume holograms.

In the example illustrated, the rear luminaire 31 in FIG. 3 is arranged at a corner of a schematically illustrated vehicle 30.

The rear luminaire 31 comprises a light source 32, which illuminates a hologram 34 with light beams 33. In the exemplary embodiment illustrated, the hologram 34 is a transmission hologram arranged in an off-axis arrangement relative to the light source 32, that is to say that the light source 32 is not situated on an axis of symmetry of the hologram 34. In this case, a wavelength of the light source 32 is preferably as close as possible to a wavelength that was used as a reference wave during the recording of the hologram 34. In some exemplary embodiments, moreover, an additional volume hologram can be provided as beam shaper, for example for suitably illuminating the hologram 34.

The light source 32 can be for example a power light emitting diode (power LED), in particular a red power diode having a light wavelength of 617 nm or 630 nm but is not restricted thereto. In this case, the hologram 34 is configured in such a way that light beams 37 emanating from the hologram 34 in response to the illumination with the light 33 form a real image 35, in the form of a rectangle in the example illustrated, at a distance 36 from the rear luminaire 31. While a rectangular shape is illustrated as the real image 35 in the example illustrated, substantially any desired shapes, including for example patterns or lettering, can be formed by means of corresponding configuration of the hologram 34. In the case of lighting devices for vehicles, consideration should be given here to ensuring that the corresponding regulations for the respective lighting devices are complied with. The real image 35 is then perceived by an observer as it were as a light source. Consequently, a volume hologram can give the impression as though the actual light source were situated outside the physical boundary of the rear luminaire 31, which allows novel optical effects.

In this regard, the distance 36 can be for example of the order of magnitude of 100 mm but is not restricted thereto. The hologram 34 can have dimensions in the region of 90×50 mm in such a case, for example. These numerical values should be understood merely as an example and can also be different depending on the implementation. Moreover, in other exemplary embodiments, a virtual image can also be generated instead of a real image.

As already touched on briefly above, requirements in respect of lighting devices for vehicles arise from various regulations. This will now be explained on the basis of the example of the geometric visibility of rear luminaires with reference to FIGS. 4A and 4B.

Figure 4A:
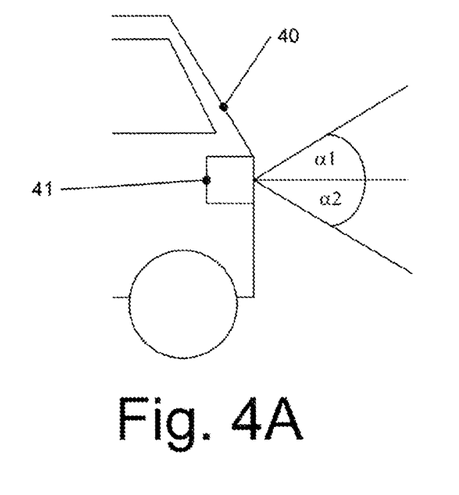
FIGS. 4A and 4B show illustrations for elucidating requirements in respect of the geometric visibility of rear luminaires.
Figure 4B:
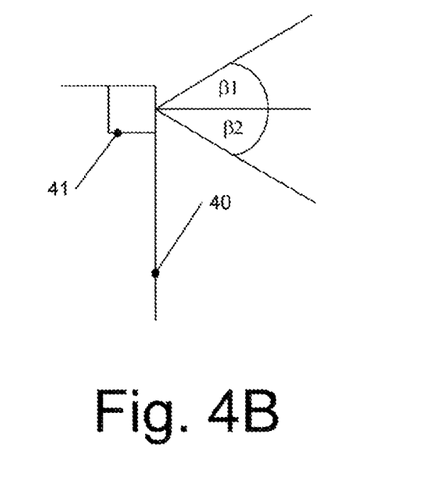

FIG. 4A shows a partial side view of a vehicle 40 having a rear luminaire 41, and FIG. 4B shows a schematic plan view of the vehicle 40 having the rear luminaire 41. Angles $\alpha 1$, $\alpha 2$ in FIG. 4A and $\beta 1$, $\beta 2$ in FIG. 4B indicate angular ranges within which the rear luminaire 41 is intended to be visible. According to the regulation ECE R7, version in 2016, minimum values are $\alpha 1 = \alpha 2 = 15°$ and $\beta 1 = \beta 2 = 45°$, for example. In the incorporated state, the angles $\beta 1$, $\beta 2$ therefore lie in a plane parallel to the ground on which the vehicle is situated, and the angles $\alpha 1$, $\alpha 2$ lie in a plane perpendicular thereto. Other regulations may be applicable in other countries. As will be explained below, as a result of generating a real image outside the physical boundaries of the rear luminaire, it is necessary to take into consideration additional requirements with regard to the positioning of the real image, in order to satisfy the requirements regarding geometric visibility. Moreover, in order actually to achieve a spatial impression, specific requirements additionally have to be made of the positioning and size of the real image. This will now be explained in greater detail with reference to FIGS. 5 and 6.

Figure 5:
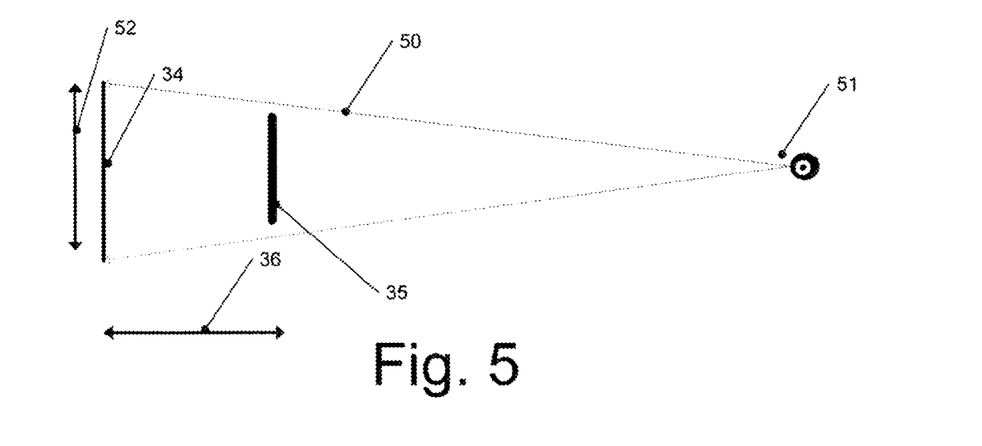
FIG. 5 shows a schematic illustration of a lighting device in accordance with one exemplary embodiment.

FIG. 5 shows a schematic plan view of a lighting device, e.g. a rear luminaire, in accordance with one exemplary embodiment. In FIG. 5, 34 represents a hologram of the lighting device, for example in a manner corresponding to the hologram 34 from FIG. 3. 35 denotes the real image as in FIG. 3. In this case, FIG. 5 shows a plan view similar to the view in FIG. 4B. As already mentioned, an extent 52 of the hologram can be in the region of 90 mm, and the distance between the real image 35 and the holographic element 34 can be 100 mm, for example. However, these dimensioning indications should be understood merely as an example and can vary depending on the implementation. The reference sign 51 in FIG. 5 denotes a so-called eyebox, from which the lighting device is viewed. The reference sign 50 denotes marginal rays for viewing the holographic element 34. In order to generate a spatial impression, in exemplary embodiments, preferably the real image 35, i.e. the generated luminous area in space, is smaller than the area of the hologram 34 (the area of the hologram should be understood to mean the holographically active proportion of the area), since otherwise a spatial impression is not present. It is thus preferred, in exemplary embodiments, for the dimensioning of the real image in space to be smaller than the dimensioning of the hologram.

Moreover, a required viewing angle range, as explained with reference to FIGS. 4A and 4B, also influences the configuration of the hologram. This will now be explained with reference to FIG. 6.

Figure 6:
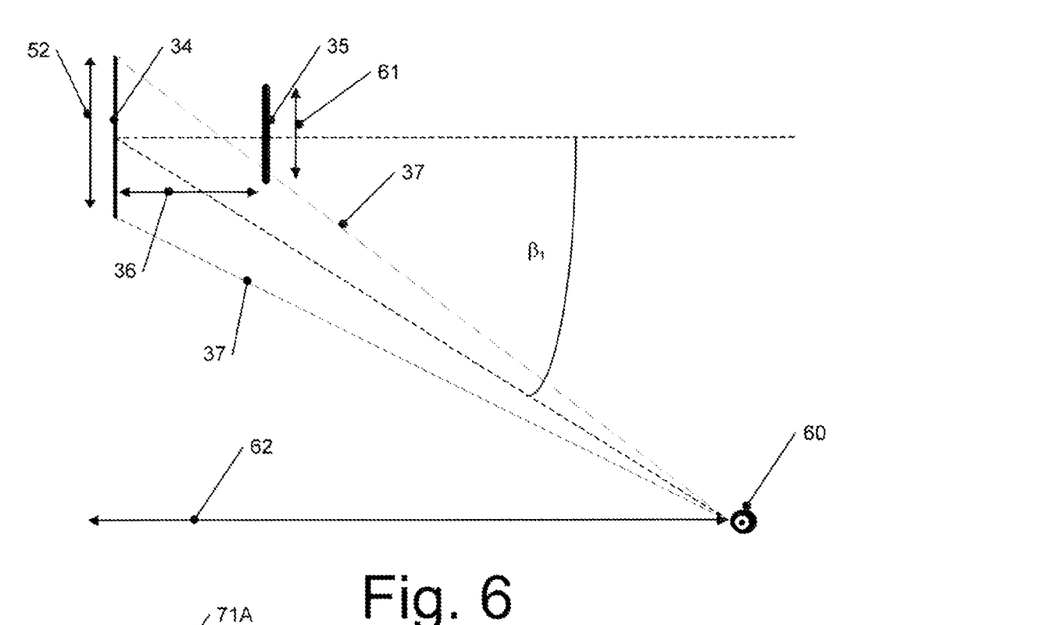
FIG. 6 shows an illustration for elucidating visibility characteristics.

In this case, FIG. 6 illustrates the situation for an eyebox 60 arranged at an angle $\beta 1$ with respect to a perpendicular to the hologram 34. In other words, FIG. 6 shows the situation for viewing the hologram 34 at an angle $\beta 1$. As explained with reference to FIG. 4B, ECE R7 demands, for example, that $\beta 1$ can be up to 45°, wherein the rear luminaire must remain visible.

52 once again denotes the dimensioning of the hologram 34, 36 denotes the distance between the real image 35 and the hologram 34, and 61 denotes the extent of the real image. As already mentioned, the extent 52 can be in the region of 90 mm, and the distance 36 can be in the region of 100 mm. Preferably, as explained with reference to FIG. 5, the dimensioning 61 of the real image 35 should be smaller than the dimensioning 52 of the hologram 34 and can be 60 mm, for example. These numerical values once again should be understood merely as an example. 62 denotes a viewing distance, i.e. a distance between the eyebox 60 and a plane of the hologram 34. The viewing distance 62 is typically significantly greater than the distance 36 and can be for example more than one meter, tens of meters or even hundreds of meters. 37 denotes marginal rays from the eyebox 60 to the hologram 34. In this case, only those parts of the real image 35 which lie within the marginal rays 37 are perceived. In the example in FIG. 6, therefore, already only a relatively small part of the real image 35 is seen.

The requirements in respect of the visibility angle, $\beta 1$ in the case of FIG. 6, thus restrict the distance 36 and also the size of the real image 35. As is readily evident from FIG. 6, with a smaller distance 36, a larger part of the real image 35 is within the marginal rays 37, or conversely a larger angle $\beta 1$ can be chosen and at least part of the real image can nevertheless remain visible. On the other hand, with a larger real image 35, a larger part of the real image is within the marginal rays 37. Consequently, with regard to visibility, a larger real image is desirable, while as explained with reference to FIG. 5 the dimensioning 61 should be smaller than the dimensioning 52 in order to bring about a spatial impression. Moreover, the spatial impression is reinforced with a larger distance 36.

Consequently, with a single straight real image 35 as shown in FIG. 6, the choice of the dimensioning 61 and of the distance 36 is always a compromise between design desires, in particular the spatial effect brought about, and requirements with regard to the visibility angle. While the angle $\beta 1$ was taken as an example in FIG. 6, corresponding considerations also apply to the other angles discussed in FIGS. 4A and 4B, i.e. $\alpha 1$, $\alpha 2$ and $\beta 2$.

Figure 7:
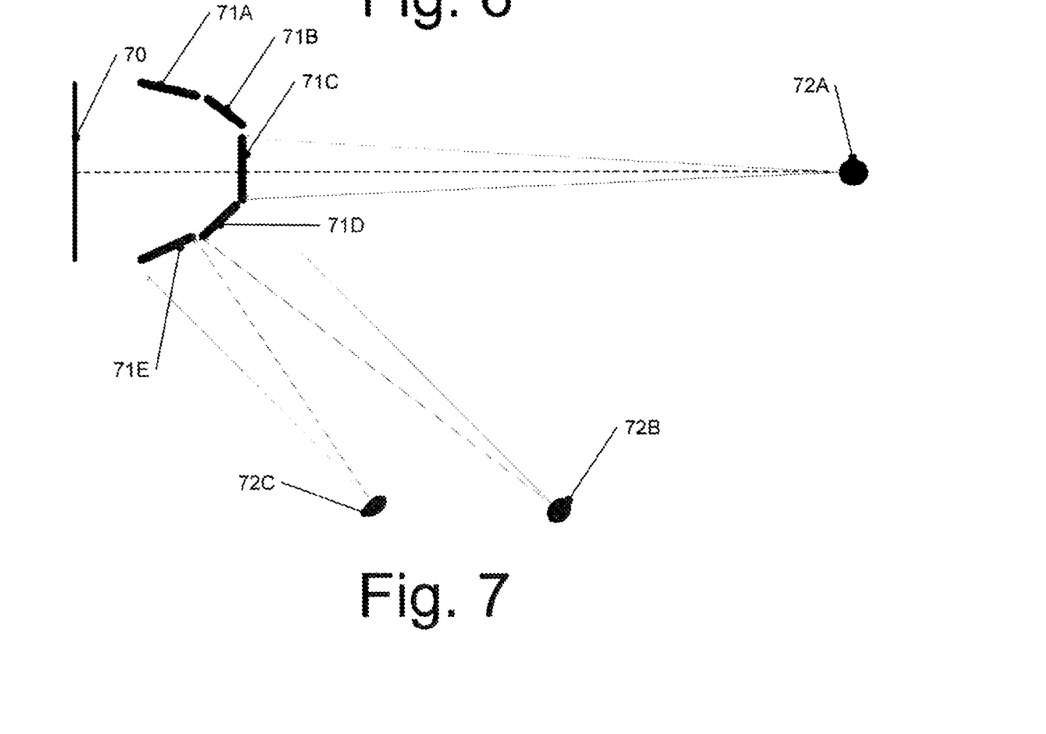
FIG. 7 shows a schematic illustration of a lighting device in accordance with a further exemplary embodiment.
Figure 8:
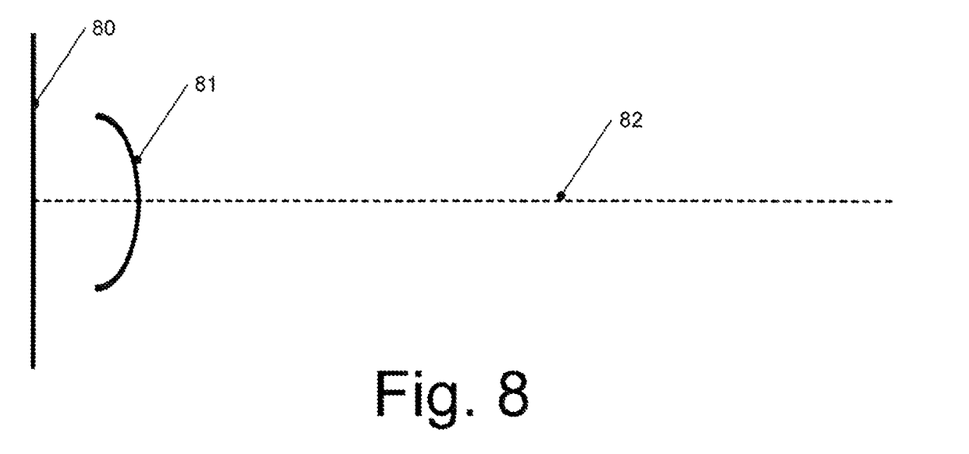
FIG. 8 shows a schematic illustration of a lighting device in accordance with a further exemplary embodiment.

In order to avoid these limitations, various possible approaches will now be provided with reference to FIGS. 7 and 8.

In the exemplary embodiment in FIG. 7, a rear luminaire comprises a hologram 70, which comprises a plurality of individual holograms. The individual holograms generate a plurality of real images 71A to 71E having different orientations. In other words, a plurality of real images 71A to 71E are provided for different angular ranges. Eyeboxes 72A to 72E are illustrated as an example, wherein the real image 71C is viewable for the eyebox 72A, the real image 71D is viewable for the eyebox 72B, and the real image 71E is viewable for the eyebox 72C. In some exemplary embodiments, the real images can have identical shapes, for example rectangular shapes. In other exemplary embodiments, the real images can be shaped differently, for example as different symbols, such that the rear luminaire gives a different optical impression depending on the viewing angle. By way of example, in the case of straight viewing (in a manner corresponding to eyebox 72A), the rear luminaire may appear rectangular, while it may be oval or triangular when viewed from an angle (for example in a manner corresponding to eyebox 72C). When choosing the shapes, it is necessary, of course, to comply with the regulations for the corresponding lighting devices. While five real images 71A to 71E are illustrated in FIG. 7, this should be understood merely as an example, and the number can also differ. In addition, a use of a plurality of real images is also possible, in principle, in the direction perpendicular to the illustrated plane. However, as explained with reference to FIGS. 4A and 4B, at least according to ECE R7, the angular range $\alpha 1$, $\alpha 2$ is smaller than the angular range $\beta 1$, $\beta 2$, such that in other exemplary embodiments a plurality of real images as illustrated in FIG. 7 can be used for covering the angular range $\beta 1$, $\beta 2$, while a single real image can be sufficient for covering the angular range $\alpha 1$, $\alpha 2$ in the direction perpendicular thereto.

An alternative possibility is illustrated in FIG. 8. In the case of the rear luminaire in FIG. 8, a hologram 80 generates upon illumination a real image 81 that is curved. 82 in FIG. 8 denotes a center axis corresponding to a straight viewing direction. The image 81 e.g. in cross section is curved semi-circularly in a manner corresponding to a segment from a lateral surface of a cylinder, as illustrated in the view in FIG. 8, or curved spherically (i.e. in a manner corresponding to a segment from a sphere) in order to cover a plurality of spatial directions. In the case of the real image 81, a rectangle is perceived from every viewing angle within an angular range (for example $\beta 1$, $\beta 2$ from FIG. 4B). Geometries different than a semicircular geometry are also possible, in principle, for example a part of a polygon, which corresponds for example to a real image corresponding to a combination of the real images from FIG. 7.

Larger angular ranges can thus be covered by the solutions in FIGS. 7 and 8.

Particularly for human-machine interaction it is desirable for a displayed image content (e.g. lettering, a shape or a color) of the rear light to be configured in a variable manner using an image generator or by means of corresponding selection and configuration of the volume hologram used. This will now be explained in greater detail with reference to FIG. 9.

Figure 9:
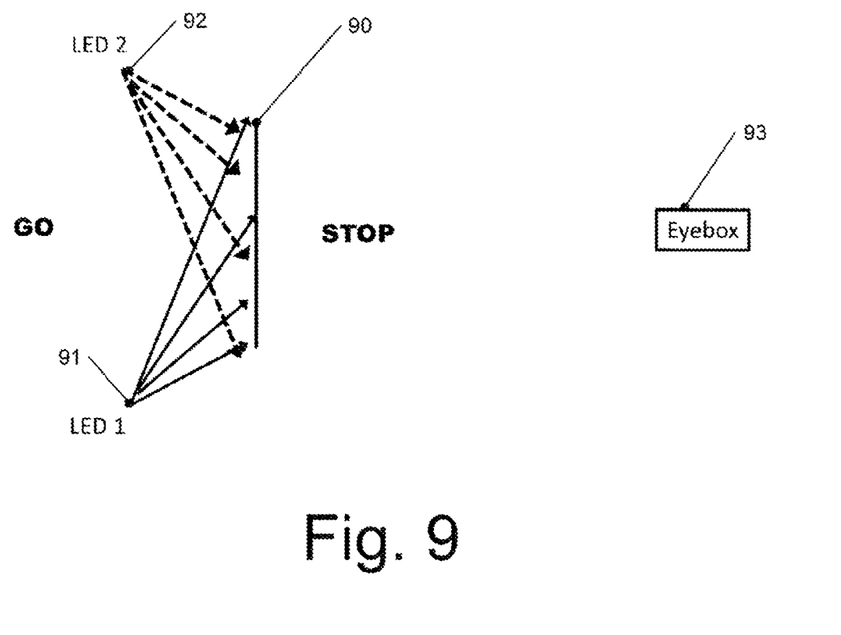
FIG. 9 shows a schematic illustration of a lighting device in accordance with a further exemplary embodiment.

Since volume holograms operate wavelength- and angle-selectively, it is possible to integrate a plurality of functions into the same holographic layer of a hologram 90 in FIG. 9, or to form the hologram 90 by means of a plurality of individual holograms stacked in a stack. These different functions or different holograms can then optionally be activated. In this regard, by way of example, a first fixed function can be played back if a red 617 nm LED 91 is switched on. Said function can contain e.g. a real image of lettering "STOP". Real here means that the lettering is situated in front of the hologram 90 as viewed from an eyebox 93. If the distance between the real image and the hologram 90 is large enough and e.g. the hologram 90 is situated on the exterior light cover of the rear luminaire, the "STOP" lettering can be projected behind the rear light into the air.

Moreover, in the exemplary embodiment in FIG. 9, a second holographic function restituted by a second light emitting diode 92 at a different location than the light emitting diode 91 can generate lettering "GO" as a virtual image behind the hologram. As a result of the different positions of the light emitting diodes 91, 92, the hologram 90 is illuminated at different angles, and only the desired function is activated as a result of the angle selectivity. Likewise, the wavelength selectivity of volume holograms can also be utilized. Instead of "STOP" and "GO", it is also possible to use other words, characters, images or symbols.

Other combinations are possible. By way of example, in some exemplary embodiments with four light emitting diodes at different positions (left, right, bottom, top in relation to the hologram) as in the case of earlier gif animations, 4 different symbols can appear as movement (walking passerby, opening and closing circle, etc.).

The optical functions can contain images, lettering, symbols or the like. They can all be represented in one plane (virtual, real or image plane=in the plane of the hologram) or in a plurality of planes.

In some exemplary embodiments, a plurality of colors is used. In this regard, e.g. the light emitting diode 91 can represent a red rear light (or symbol), and the light emitting diode 92 a yellow flashing light. A combination with more colors (e.g. green traffic light symbol for pedestrians) is likewise possible.

In addition to the volume holograms with fixedly written content that is manifested depending on the restitution, it is also possible to use an image generator with variable content.

The generation of transmission holograms for generating virtual images, real images or images at infinity will be explained in greater detail below, wherein as an example of the use of these holograms, an illumination is then carried out by means of an image generator for generating variable image contents.

Figure 10:
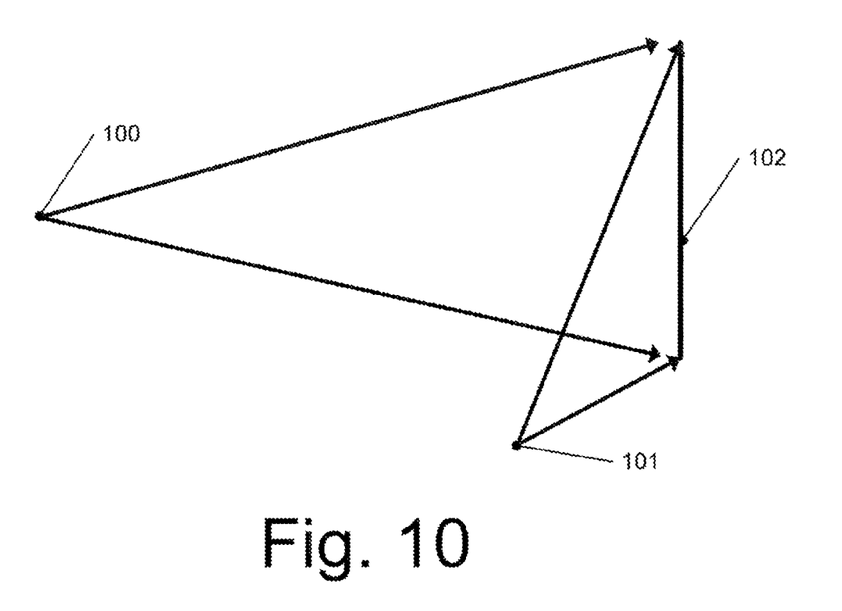
FIGS. 10-12 show illustrations for elucidating the production of volume holograms for various exemplary embodiments.

FIG. 10 illustrates the generation of a transmission volume hologram for the generation of a virtual image. For this purpose, 2 spherical waves 100, 101 are brought to interference in a holographic layer of a hologram 102 to be produced. The interference pattern thus generated produces a local change in the refractive index in the holographic layer. The wave 100 is referred to as reference wave, and the wave 101 as signal wave. In order to generate a virtual image, the reference wave 100 is divergent. During the corresponding playback process shown in FIG. 13, a diffusing plate 131 is situated at the originating position of the signal wave, an intermediate image being imaged on said diffusing plate. Said intermediate image is generated by an image generator unit 130 in the example in FIG. 13. In this regard, it is possible to use e.g. a commercially available laser picoprojector with scanning laser projection technology. Image generators using the DLP micromirror array technology, LCoS displays or laser TFTs are likewise possible. In all variants preference is given to the use of a narrowband source (line width less than <2 nm) and the imaging of an intermediate image on a ground glass screen. In order to minimize the speckle effect, said ground glass screen can also be a moving diffusing plate that is likewise commercially available.

Figure 13:
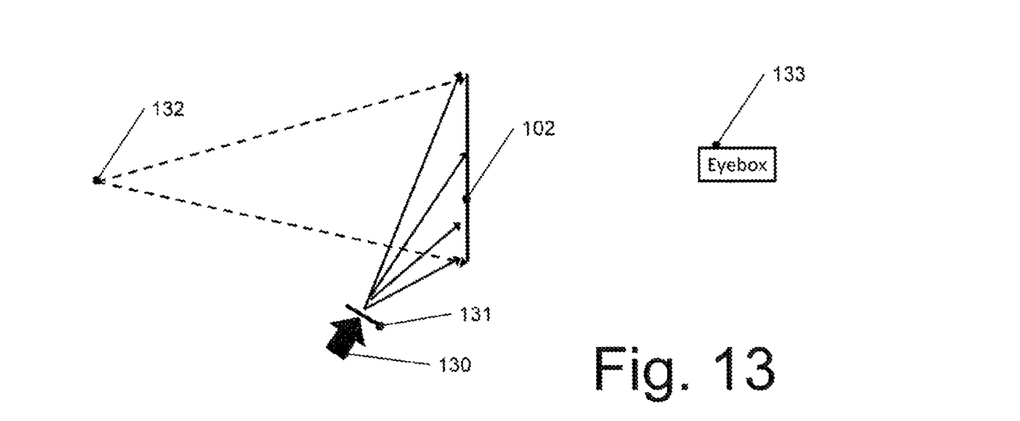
FIGS. 13-15 show illustrations for elucidating the use of the volume holograms from FIGS. 10-12.

The image arising on the diffusing plate 131 is imaged thereby as a virtual image 132 at a finite distance corresponding to the origin of the reference wave 100 for viewing from an eyebox 133.

Figure 11:
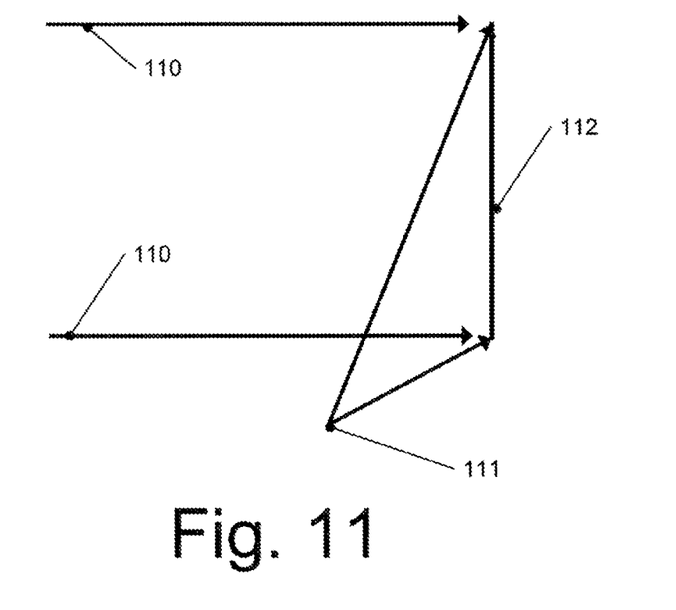

FIG. 11 shows the generation of a hologram 112 for generating an image at infinity. Here a signal wave 111 as a spherical wave is brought to interference with a collimated (parallel) reference wave 110 in a holographic layer of the hologram 112. In the case of the restitution shown in FIG. 14 by means of illumination with an image generator 140 and a diffusing plate 141, corresponding to the image generator 130 and the diffusing plate 131, in a manner corresponding to light beams 142, an image at infinity is generated upon viewing from the eyebox 143.

Figure 12:
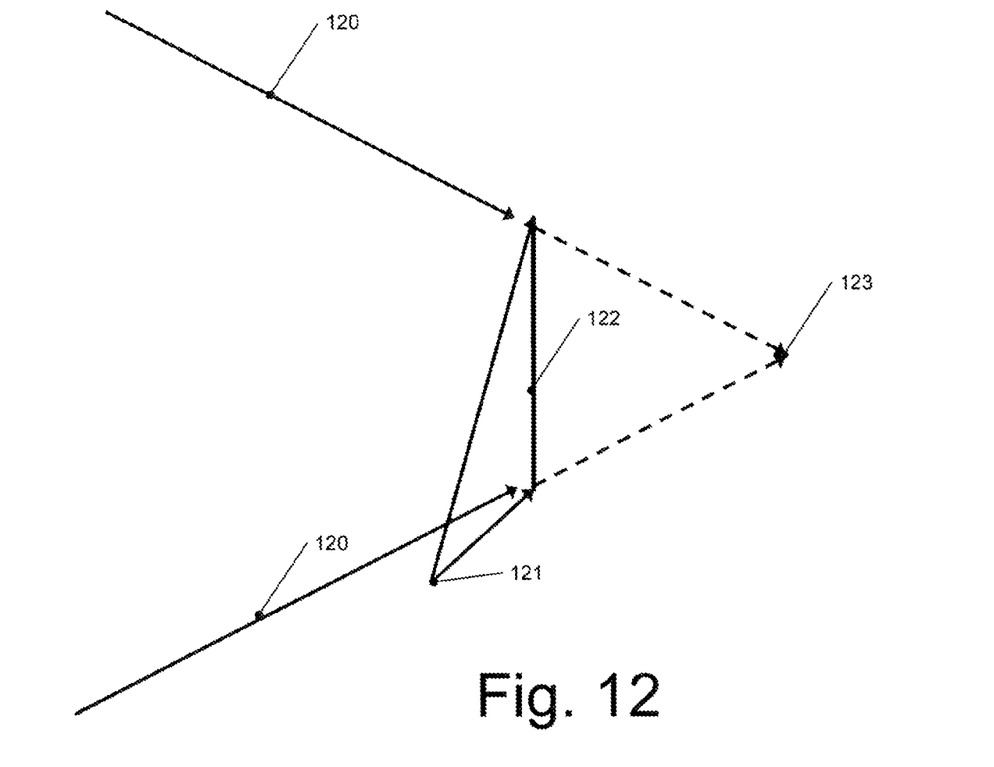

FIG. 12 shows the generation of a hologram 122 for generating a real image. Here a signal wave 111 as a spherical wave is brought to interference with a reference wave 120 convergent toward a point 123 in a holographic layer of the hologram 122. In the case of the restitution shown in FIG. 15 by means of illumination with an image generator 150 and a diffusing plate 151, corresponding to the image generator 130 and the diffusing plate 131, a real image 152 corresponding to the position of the point 123 is generated upon viewing from the eyebox 143.

Figure 14:
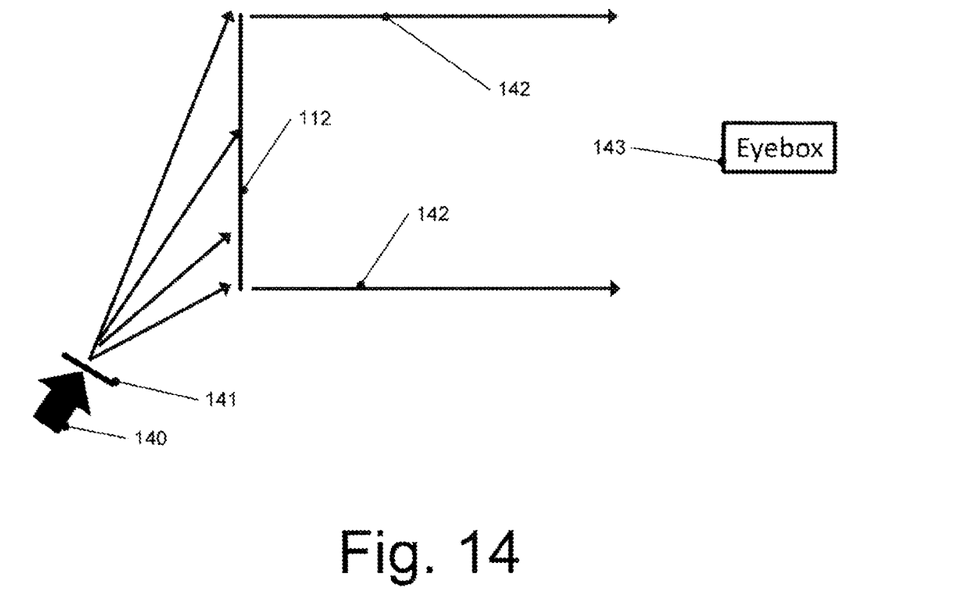
Figure 15:
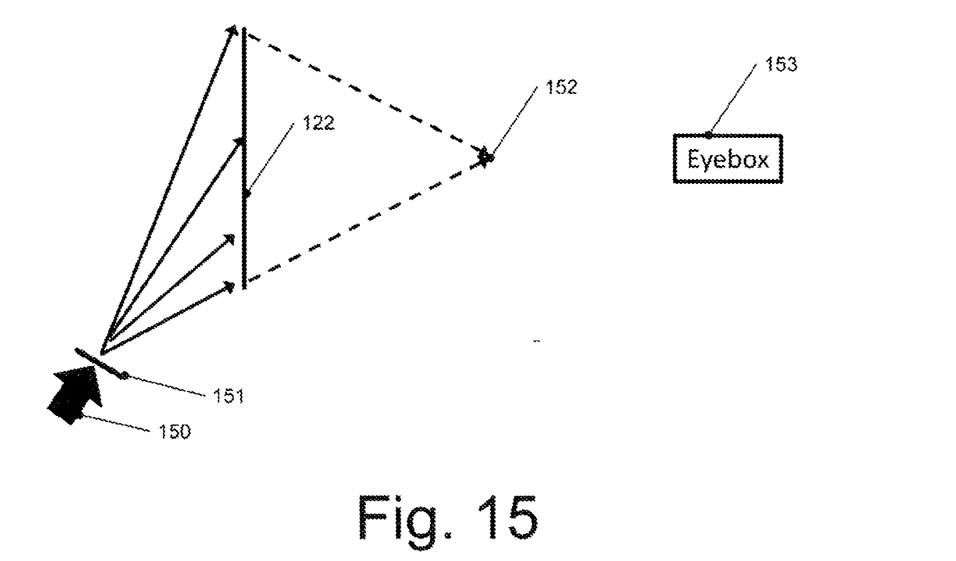

For generation of a 3D object, in some exemplary embodiments, a phase modulator is used as image generator (e.g. 130, 140, 150). The use of phase modulators for holographic projection is described in "Simple holographic projection in color; Michal Makowski vol. 20, No. 22/OPTICS EXPRESS 25130". The phase modulator is used as a digital CGH (computer-generated hologram) and can represent arbitrary objects. Use of the phase modulator as image generator obviates the need for the diffusing plate for intermediate image generation. The holographic object generated by the phase modulator is imaged directly by the volume hologram and represented as a virtual, real or image-plane (in the plane of the volume hologram) object depending on the design.

The described variants for image generation (static, variable with 2D image generator, variable with 3D image generator=phase modulator) can find application not only for rear lights in the automotive industry, but also in other vehicle luminaires, e.g. brake lights or flashing indicators.

The advantage of the arrangements described over holographic projection systems having reflection holograms is that the image generator is situated behind the hologram.

Nevertheless, the image generator arrangements described can also be used for reflection holograms (e.g. holographic head-up displays).

The arrangements described use the area of the volume hologram as a transparent display unit. With use of narrowband sources (e.g. RGB laser projector) and the design of the holographic layer for two or more wavelengths, it is possible to produce polychromatic transparent displays.

All materials whose refractive index can change locally can be used as a holographic layer (recording medium). Photopolymers, plastics (PQ-doped PMMA, photorefractive glasses, etc.) are suitable. The advantage of photopolymers is that they can be laminated as films directly onto the exterior light cover of the rear luminaire of an automobile.

As already explained, although rear luminaires were used above as examples of lighting devices for vehicles, the techniques presented can also be applied to other lighting devices such as, for example, flashing indicators or brake luminaires. While a transmission hologram 34 is used for example in FIG. 3, reflection holograms as explained with reference to FIG. 2 can also be used in other exemplary embodiments.

The use of reflection holograms is made more difficult in some applications in the automotive field, however, since with the use of a reflection hologram, the light source in principle has to be situated in the same half-space as the observer (i.e. on the same side of the hologram as the viewer), as illustrated in FIG. 2. For a rear luminaire in which the hologram is situated in an exterior light cover of the rear luminaire, the light source would thus have to be situated outside the automobile. Reflection holograms have the advantage, however, that they have a larger angular acceptance than transmission holograms and at the same time filter the wavelength to a much greater extent than transmission holograms. With the use of reflection holograms, the wavelength of the light source would not have to be limited by additional measures.

Figure 16:
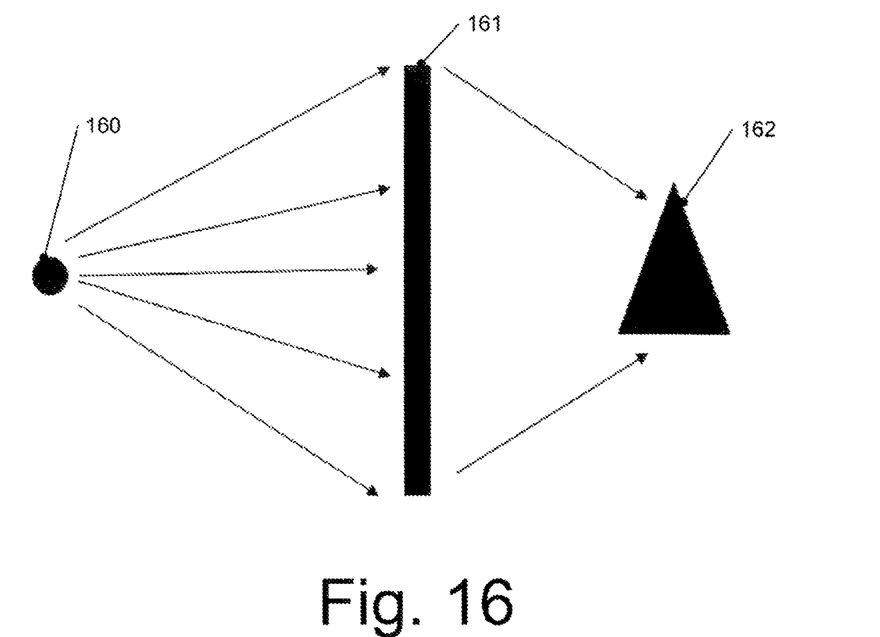
FIG. 16 shows an illustration of a lighting device in accordance with a further exemplary embodiment.

In this regard, a lighting device as illustrated in FIG. 16 is provided. The lighting device comprises a point light source 160, e.g. a light emitting diode, on one side of a hologram stack 161 (illustrated on the left-hand side in FIG. 16). In the case of use as a vehicle luminaire, the light source 160 is situated in the interior of the vehicle, and the hologram stack 161 can be fitted on an exterior of the vehicle, e.g. in or on an exterior light cover. The arrangement of point light source 160 symmetrically with respect to the hologram stack 161 is not necessary; an off-axis arrangement is also possible. The hologram stack 161 comprises two or more holograms, at least one hologram of which is a reflection hologram, and in particular it comprises two reflection holograms. One example of this is explained further below with reference to FIG. 17.

The hologram stack 161 generates a real image 162 on the opposite side of the hologram stack 161 with respect to the light source 160, on the right-hand side in the illustration in FIG. 16. In the case of use as a lighting device in a vehicle, said real image 162 can be situated in particular outside the vehicle. The concept is that a hologram stack is used instead of an individual hologram. The use of a hologram stack having one or more reflection holograms makes it possible to utilize the described positive properties of reflection holograms (color filtering, large angular acceptance) for a transmission arrangement as shown in FIG. 16.

Figure 17:
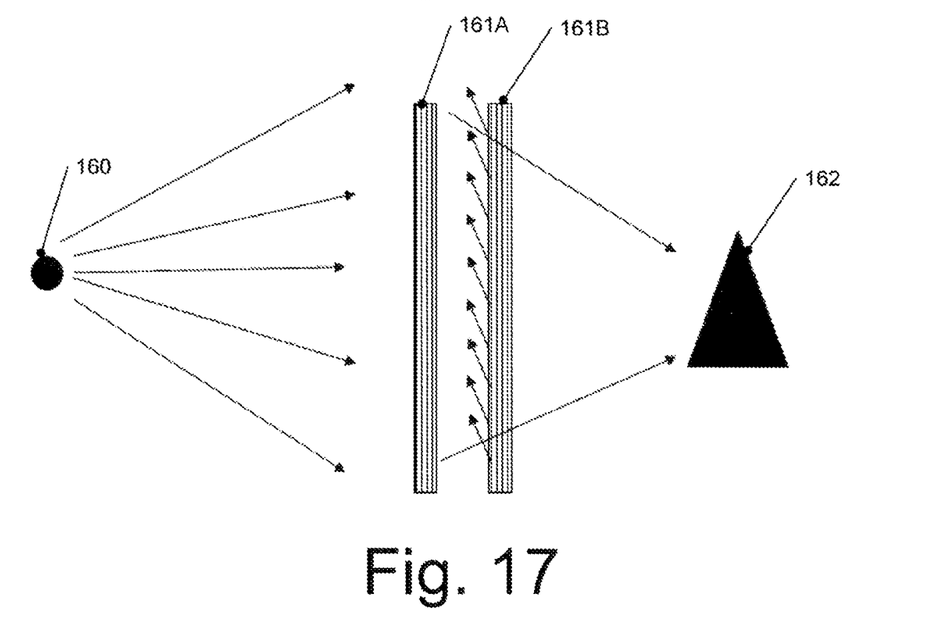
FIG. 17 shows one exemplary implementation of the lighting device from FIG. 16.

One example of a hologram stack having a first reflection hologram 161A and a second reflection hologram 161B is illustrated in FIG. 17. Otherwise, the construction in FIG. 17 corresponds to that in FIG. 16.

In FIG. 17, the light from the light source 160 passes through the first reflection hologram 161A without being obstructed. In this case, the second reflection hologram 161B is a point-to-plane hologram and reflects the light from the point light source 160 e.g. substantially as a plane wave back into the half-space of the point light source 160 at a specific angle lying in particular in the acceptance angle range of the first reflection hologram 161A. The first reflection hologram 161A in FIG. 17 diffracts the light under and back in the direction of the second reflection hologram 161B. This is done at an angle chosen such that the second reflection hologram 161B allows the light to pass through at least substantially without being obstructed, in order to generate the real image 162.

Finally, the light coming from the light source 160, as a result of the filtering and diffraction at the reflection holograms 161A and 161B, reaches the half-space situated opposite with respect to the light source 160 (on the right-hand side in FIG. 17). In this arrangement, the optical hologram function that is finally visible is generated by the first reflection hologram 161A, that is to say that the latter determines the appearance of the real image 162.

As evident from the explanations above, diverse variations and modifications are possible. Therefore, the exemplary embodiments presented should not be interpreted as restrictive.

The invention claimed is:

1. A lighting device configured as a front headlight or rear luminaire for a vehicle, comprising:
    a multiplicity of individual holograms that, when illuminated, generate a corresponding multiplicity of real individual images having different spatial orientations; and
    a light source configured to illuminate the multiplicity of individual holograms;
    wherein, with respect to the lighting device being in its installed orientation in the vehicle, the multiplicity of individual holograms is configured to generate the corresponding multiplicity of real individual images at corresponding locations in free space at the front or rear of the vehicle that are outside physical boundaries of the lighting device.

2. The lighting device of claim 1, wherein the different spatial orientations are configured to provide a vertical or horizontal viewing angle range for the multiplicity of individual real images that is greater than thirty degrees.

3. The lighting device of claim 1, wherein the multiplicity of individual holograms is configured so that the individual real images in the multiplicity of individual real images have a same image shape, thereby yielding a same perceived image shape in the eye of a viewer of the lighting device, over a range of viewing angles.

4. The lighting device of claim 1, wherein the multiplicity of individual holograms is configured so that at least some of individual real images in the multiplicity of individual real images have different image shapes, thereby yielding a different perceived image shape in the eye of a viewer of the lighting device, over a range of viewing angles.

5. A lighting device configured as a front headlight or rear luminaire for a vehicle, comprising:
    a hologram that, when illuminated, generates a real image having a curved shape; and
    a light source configured to illuminate the hologram;
    wherein, with respect to the lighting device being in its installed orientation in the vehicle, the hologram is configured to generate the real image having the curved shape at a corresponding location in free space at the front or rear of the vehicle that is outside physical boundaries of the lighting device, when illuminated by the light source.

6. The lighting device of claim 5, wherein the hologram comprises a multiplicity of individual holograms configured to form the real image as a corresponding multiplicity of individual real images at different spatial orientations at corresponding locations in free space at the front or rear of the vehicle that are outside the physical boundaries of the lighting device.

7. The lighting device of claim 6, wherein the different spatial orientations as between or among two or more of the individual real images, along with corresponding differences in at least one of image size or image shape, produce the curved shape of the real image formed by the multiplicity of individual real images.

8. The lighting device of claim 5, wherein the curved shape provides a vertical or horizontal viewing angle range for the real image that is greater than thirty degrees.

9. The lighting device of claim 5, wherein the real image comprises a plurality of real images at corresponding locations in free space at the front or rear of the vehicle that are outside the physical boundaries of the lighting device, and wherein hologram is a stacked hologram comprising a plurality of stacked individual holograms, each individual hologram configured to generate a corresponding one of the real images at a corresponding one of the locations in free space.

* * * * *

UNITED STATES PATENT AND TRADEMARK OFFICE
CERTIFICATE OF CORRECTION

PATENT NO. : 11,537,078 B2  
APPLICATION NO. : 16/334512  
DATED : December 27, 2022  
INVENTOR(S) : C. Erler

Page 1 of 1

It is certified that error appears in the above-identified patent and that said Letters Patent is hereby corrected as shown below:

In the Specification

Column 7, Line 10, please change "sign 50" to -- sign 51 --  
Column 10, Line 26, please change "wave 111" to -- wave 121 --  
Column 10, Line 34, please change "eyebox 143" to -- eyebox 153 --

Signed and Sealed this  
Thirty-first Day of October, 2023

Katherine Kelly Vidal  
*Director of the United States Patent and Trademark Office*